Patented Jan. 1, 1929.

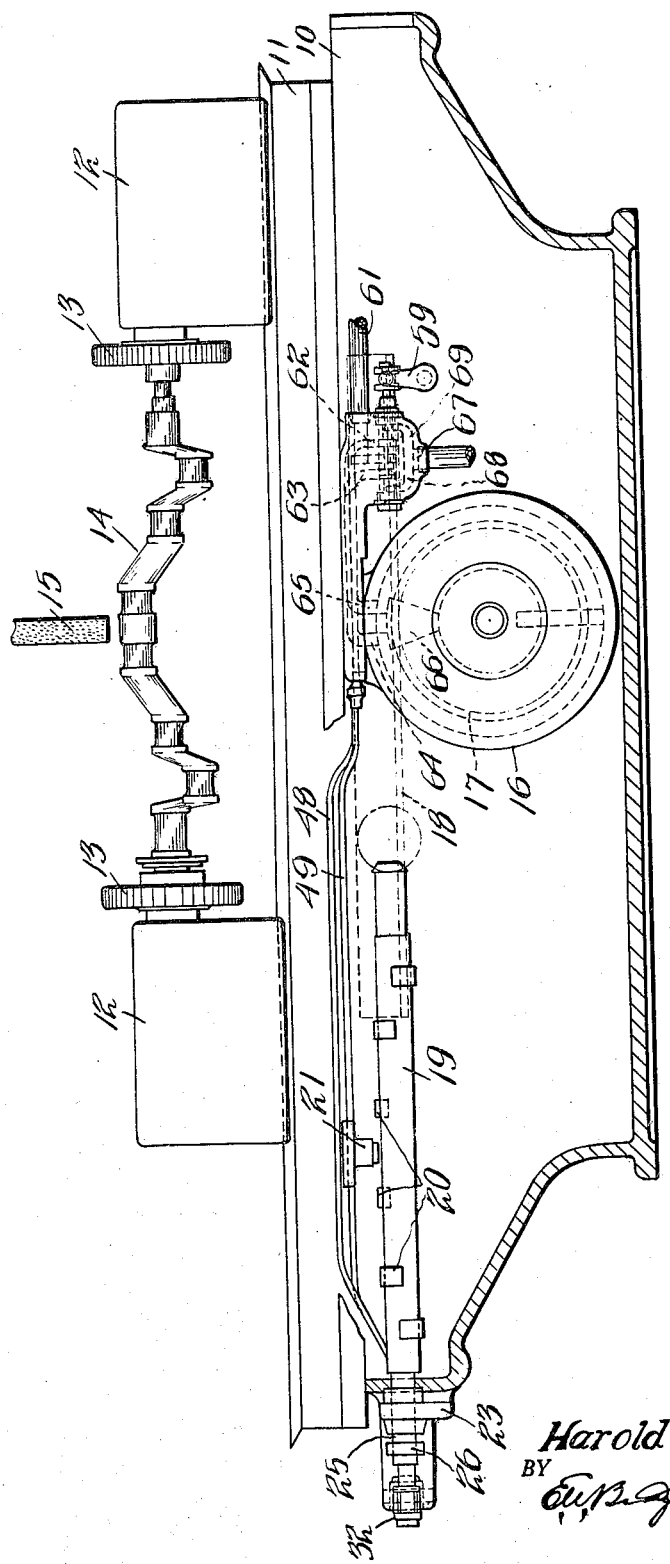

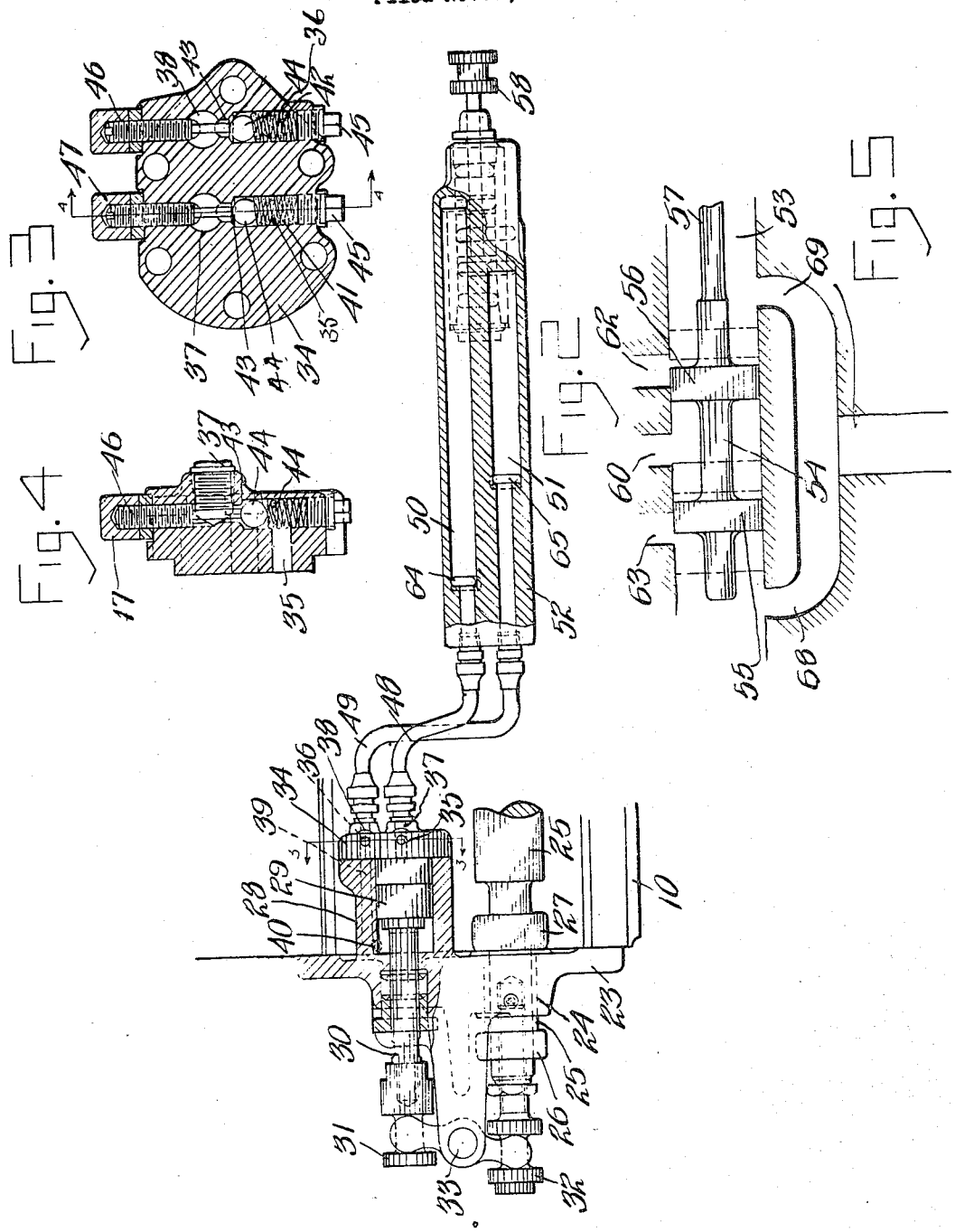

1,697,748

UNITED STATES PATENT OFFICE.

HAROLD E. BALSIGER, OF WAYNESBORO, PENNSYLVANIA, ASSIGNOR TO LANDIS TOOL COMPANY, OF WAYNESBORO, PENNSYLVANIA, A CORPORATION.

HYDRAULIC CUSHIONING DEVICE.

Application filed November 8, 1927. Serial No. 231,878.

My invention relates to hydraulic cushioning devices and is particularly adapted for use on machines having reciprocating carriages and it is an object of the invention to provide means for absorbing the shock or jar caused by a heavy work carriage coming in contact with a positive stop.

A further object of the invention is to provide a cushioning device which will always be ready to operate regardless of the direction in which the carriage is travelling.

A still further object of the invention is to provide a valve for use with a motor on a reciprocating carriage of the above character, which when in neutral position will permit the carriage to be moved in either direction by holding both discharge ports open.

Referring to the accompanying drawings which are made a part hereof and on which similar reference characters indicate similar parts, Figure 1 is a front elevation partly in section of a grinding machine showing the location of the cushioning device, Figure 2, a plan view partly in section showing a cushioning device and reversing valve for the traverse motor, Figure 3, a section of the cylinder cover taken on the line 3—3 of Fig. 2, Figure 4, a section on the line 4—4 of Fig. 3, and Figure 5, an enlarged sectional elevation of the reversing valve proper.

In the drawings numeral 10 indicates the bed of a grinding machine having a work carriage 11 slidably mounted thereon. The work carriage has driving heads 12 mounted thereon, and work clamping fixtures 13 for supporting work 14. Numeral 15 indicates an abrasive wheel for operation upon the work in a conventional manner. The reciprocating carriage is moved by an oscillating hydraulic motor 16 which drives the carriage by means of a pinion 17 and a rack 18 the latter being secured upon the carriage 11.

A spacing bar 19 having stops 20 secured at predetermined intervals thereon is mounted upon the base of the machine 10. A member 21, secured upon the reciprocating carriage 11 is positioned so as to engage one of the stops upon the spacing bar. The stops on the spacing bar are so arranged as to stop the traversing carriage in such position as will bring the work 14 in position to grind any one of a number of pins on the work 14 as indicated in Fig. 1. As shown for example in Fig. 1, the carriage is in position midway between the two central pins on the work 14.

The spacing bar with the stops thereon and the contacting member on the traversing carriage 11 are shown and described in a copending application, Serial No. 126,583, filed August 2, 1926, and further description here is believed unnecessary other than to say that the bar described in the application above referred to is longer than the one shown herein.

In moving the work carriage 11 to move the work from one pin to another it is obviously necessary to stop the carriage at the exact point where the succeeding pin will be engaged by the grinding wheel. Since work carriages on grinding machines are very heavy, stopping the carriage when travelling at a comparatively high speed produces severe shocks, causes destructive wear and tear and tends to reduce materially the life of the machine. The object of this invention is to provide a cushioning device that will ease the shock produced by the stopping of the carriage and yet will position the crank pins accurately before the grinding wheel.

Secured to the bed 10 of the machine, as shown in Figs. 1 and 2, is a bracket 23. This bracket is provided with a bearing 24 for the spacing bar 19 above referred to. The spacing bar 19 has a sleeve 25 fitting in bearings 24 and nuts 26 and 27 screwed tightly up against the ends of the sleeve to limit the endwise movement of the bar by contacting with the bracket 23. The nuts provide for longitudinal positioning of the bar and the sleeve provides for the amount of travel which the bar may have. This will be more fully explained in a later paragraph.

The bracket 23 also carries a cylinder 28. A piston 29 moves therein. The piston has a piston rod 30 extending preferably parallel to the bar 19. The piston rod 30 and the bar 19 have spools 31 and 32 upon their respective outer ends. A toggle link pivoted at 33 has its ends in engagement with the spools so that longitudinal movement of the piston rod 30 will cause a longitudinal movement of the spacing bar in the opposite direction.

The piston 29 is operated by motive fluid taken from the ports leading to the main motor 16 in the following manner: The cylinder 28 has a head 34 provided with ports 35 and 36 on one side bored only partly through the head and with ports 37 and 38 bored in a similar manner on the other side. The bore 35 leads into the cylinder to the right of the piston. The bore 36 registers with a longitudinal bore 39 in the wall of the cylinder. This latter bore leads into the cylinder through a port 40 at the left of the piston as shown best in Fig. 2. The head also has transverse bores 41 and 42. These are bored from each end so as to connect the bore 35 with the bore 37 and the bore 36 with the bore 38. The port connecting these respective bores is smaller than the remainder so as to provide valve seats 43 for ball valves 44. These ball valves are held in place by springs seated in the bores and held therein by screw plugs 45. The other ends of the bores 41 and 42 have screws 46 therein which have small ends positioned within the valve seat 43 so as to hold the ball valves slightly off their seats. The outer ends of the screws are provided with lock nuts 47.

As may be readily seen, the ball valves provide for ready passage of fluid into the cylinder but restrict the flow from the cylinder.

The ports 37 and 38 are connected through pipes 48 and 49 with chambers 50 and 51 in a casting 52. This casting forms part of the casing for the valve controlling the admission of motive fluid to the main motor 16. The chamber 50 connects with the side of the motor which drives the motor in a counter-clockwise direction while the chamber 51 communicates with the ports through which motive fluid passes to drive the motor in a clockwise direction.

The valve which controls admission of motive fluid to the motor 16 will now be described. The casting 52 has a chamber 53 therein for receiving a piston valve 54. This valve has two spaced disks 55 and 56 joined by a neck. The piston has a stem 57 extending through the end of the casing which has a spool 58 thereon. A crank arm 59 to which is attached a lever or crank not shown, preferably affords means for operating the valve stem.

A port 60 enters the cylinder intermediate the disks on the valve. This port is in communication with a source of fluid under pressure through the pipe 61. Ports 62 and 63 on opposite sides of the port 60 lead to chambers 50 and 51 respectively from which passages or ports 64 and 65 lead to the chambers in the motor on opposite sides of the abutment 66. A port 67 having branching ends 68 and 69 leading to the chamber 53 at opposite sides of the disks on the valve provides an exhaust for the motor. When the valve is moved to the right as shown in dotted lines in Figure 5 motive fluid entering through port 60 passes through the valve to the port 62 thence to the chamber 50 and port 64 to the motor 16 to drive the same in a counter-clockwise direction, the port 63 being open to the exhaust ports 68 and 67. When the valve is shifted to the left the port 62 is opened to the exhaust and port 63 is opened to port 60 to deliver motive fluid through port 63, chamber 51, and port 65 to the motor to drive the motor in a clockwise direction. When the valve is in the position shown in full lines in Fig. 5 the port 60 is cut off from both ports 63 and 62 and these latter two ports are open to the exhaust. When motive fluid is cut off from the motor entirely, both sides of the motor are open to the exhaust. This enables an operator to freely rotate the motor by hand.

The operation of the device is as follows: When the operator desires to shift the work carriage to the left, for example, he moves the valve stem 57 to the right. This opens communication between the ports 60 and 62 to deliver motive fluid to the chamber 50 thence through port 64 to the motor to drive the same in a counter-clockwise direction and through the pinion 17 and rack 18 to drive the carriage to the left. Motive fluid from the chamber 50 at the same time passes through pipe 48 to the valve 44 and into the end of the cylinder 28 at the right of the piston 29 to force the latter to the left and to move the spacing bar to the right until the nut 26 engaging the bracket 23 stops it. The bar remains in this position until the stop member 21 contacts with the stop 20 on the spacing bar. The movement of the carriage will force the spacing bar to the left until the nut 27 engages the side of the bracket 23. Since the motive fluid in the cylinder must pass through a restricted port past the ball valve 44, its movement must necessarily be slow. This will slow down the travel of the carriage and act as a cushion to ease the stopping of the carriage. At the same time the desired pin on the crank 14 will be properly positioned before the grinding wheel. When the carriage is moved in the opposite direction motive fluid will be admitted to the cylinder 28 at the left of the piston to position the spacing bar to the extreme left position. When the contact on the carriage engages a stop on the bar it will move the bar slowly to the right until it is stopped by the nut 26 engaging the bracket 23. It will be seen, therefore, that whenever the main motor is operated to drive the carriage in either direction the spacing bar will be immediately positioned to receive and cushion the stopping of the carriage.

It will also be seen that when the motive fluid is cut off, the motor will be open to the exhaust as also will the cylinder 28.

It will be obvious to those skilled in the art that various changes may be made in my device without departing from the spirit of the invention, and I, therefore, do not limit myself to what is shown in the drawings and described in the specification but only as set forth in the appended claims.

Having thus fully described my said invention, what I claim as new and desire to secure by Letters Patent, is:

1. In a grinding machine comprising a grinding wheel, work holding devices and a traversable work carriage, a hydraulic motor for reciprocating said carriage, a cushioning device operated simultaneously with said motor to move in a direction opposite to the movement of the carriage, and means for causing the cushioning device to move slowly in the direction of travel of the carriage but to retard the movement of the carriage when engaged by it, substantially as set forth.

2. A cushioning device for reciprocable carriages, comprising means hydraulically operated in timed relation with the movement of the carriage to position it in the path of the moving carriage, means for engagement by a portion of the carriage, and means permitting only a slow reverse movement after engagement by the moving carriage to slow down the movement of the carriage, substantially as set forth.

3. In a machine of the kind described, a carriage, means for traversing the carriage, means for stopping said carriage in any one of a number of predetermined positions, pressure fluid means for moving said last named means in a direction opposite to the movement of the carriage, and means permitting the said means to be moved slowly to its original position when engaged by the carriage, substantially as set forth.

4. In a machine having a reciprocating carriage, a motor for driving said carriage, means for stopping said carriage in any one of a number of predetermined positions, means operated simultaneously with the movement of the carriage for positioning said stopping means a short distance in advance of the desired predetermined position of the carriage, the said last named means being insufficient to hold the stopping means against the moving carriage but causing a slowing down of the carriage until it reaches the predetermined desired position, substantially as set forth.

5. In a machine having a reciprocating carriage, a motor for driving said carriage, a valve controlling the admission of motive fluid to said motor, a bar having spaced contacts thereon for engagement by the carriage whereby the carriage is stopped in any one of a number of predetermined positions, a cylinder, a piston in said cylinder, operative connection between said piston and said bar, means for diverting a portion of the motive fluid from said motor to said cylinder to operate the piston therein and the said bar, the said motive fluid acting to move the bar in a direction opposite to the movement of the carriage, and means restricting the flow of motive fluid from said cylinder to slow down the movement of the said bar when engaged by the moving carriage and thereby retard the movement of the carriage, substantially as set forth.

6. A cushioning device for a grinding machine carriage comprising a stop bar, spaced apart nuts on said bar positioned on opposite sides of a bearing and adapted to allow a slight endwise movement of the bar, a cylinder, a piston in said cylinder, a link connecting said piston with said bar whereby movement of the piston will also move the bar, valves for admitting fluid to said cylinder to move said piston, the said valves having means for permitting free passage of fluid to the cylinder but restricting the flow from the cylinder, and means for connecting the valves with the source of power which drives the carriage so that the bar shall be moved simultaneously with the movement of the carriage but in an opposite direction, substantially as set forth.

7. A cushioning device for a reciprocating carriage comprising a bar having lugs thereon for engagement with the carriage to stop it in any one of several predetermined positions, means for leading a portion of the motive fluid for the carriage to act to drive the said bar a short distance in a direction opposite to the travel of the carriage, and means for restricting the return of the motive fluid, substantially as set forth.

8. In combination, a grinding wheel, a work carriage, means for reciprocating said carriage, a spacing bar, means operated by the carriage for positioning said bar in a direction opposite to the movement of the carriage, and means for restricting the return of the motive fluid to slow down the travel of the said bar to allow the carriage to move to the limit of its stroke when the carriage contacts with the said spacing bar, substantially as set forth.

9. A cushioning device for reciprocating carriages comprising a spacing bar having contacts thereon for engagement by the carriage whereby the carriage is stopped in any one of a number of predetermined positions, and means operated from the main source of force that moves the carriage for moving the said bar to a position in advance of the predetermined stopping position, the said means yielding to the momentum of the carriage to permit the same to move slowly to its predetermined stop position, substantially as set forth.

10. In a grinding machine, a spacing bar having contacting lugs thereon for engagement by a traversing carriage, adjustable nuts on the bar which permit the same to be positioned longitudinally to position the stop in any predetermined place, fluid pressure means for moving the said bar in one direction, and a valve for admitting said fluid pressure to act to move said bar in one direction, the said valve having a restricted return passage whereby the bar may move in the opposite direction only with a retarded motion, substantially as set forth.

11. In a grinding machine, a spacing bar having stops adapted to stop a traversing carriage in any one of a number of predetermined positions, a cylinder and a piston for moving said bar to a position in advance of its position to stop the carriage, means connecting said cylinder to the source of motive fluid which drives the traversing carriage, the said connection comprising a ball valve adapted to permit fluid to flow freely to the cylinder but restricting the flow from the cylinder, substantially as set forth.

12. A cushioning device for a moving carriage comprising a bar having a stop thereon for engagement by the carriage, spaced nuts on said bar to limit its movement in either direction, pressure fluid means for moving the said bar in a direction opposite to the movement of the carriage, and a restricted fluid passage adapted to permit slow passage of the fluid to allow the bar to move through retarded movement in the direction in which the carriage moves, substantially as set forth.

In witness whereof, I have hereunto set my hand at Waynesboro, Pennsylvania, this 3rd day of November, A. D. nineteen hundred and twenty-seven.

HAROLD E. BALSIGER.